US011478100B2

(12) United States Patent
Fiveash (10) Patent No.: US 11,478,100 B2
(45) Date of Patent: Oct. 25, 2022

(54) CHRISTMAS TREE STAND

(71) Applicant: CINCO PLASTICS, INC., Houston, TX (US)

(72) Inventor: Ramon A Fiveash, Houston, TX (US)

(73) Assignee: CINCO PLASTICS, INC., Houston, TX (US)

( * ) Notice: Subject to any disclaimer, the term of this patent is extended or adjusted under 35 U.S.C. 154(b) by 141 days.

(21) Appl. No.: 16/868,090

(22) Filed: May 6, 2020

(65) Prior Publication Data

US 2020/0352379 A1 Nov. 12, 2020

Related U.S. Application Data

(60) Provisional application No. 62/920,595, filed on May 6, 2019.

(51) Int. Cl.
*A47G 33/12* (2006.01)
*F16M 11/22* (2006.01)

(52) U.S. Cl.
CPC ............. *A47G 33/12* (2013.01); *F16M 11/22* (2013.01); *A47G 2033/1286* (2013.01); *F16M 2200/08* (2013.01)

(58) Field of Classification Search
CPC ........... A47G 33/12; A47G 2033/1286; F16M 11/22; F16M 2200/08
USPC ............... 248/158, 161, 404, 412, 157, 420, 248/229.13, 229.23, 231.51, 316.5; 47/42, 40.5
See application file for complete search history.

(56) References Cited

U.S. PATENT DOCUMENTS

| 150,900 | A | 5/1874 | Silver et al. |
| 236,239 | A | 1/1881 | Morris |
| 294,781 | A | 3/1884 | Hilts |
| 854,512 | A | 5/1907 | Mapes |
| 1,091,000 | A | 3/1914 | Lyman |
| 1,110,142 | A | 9/1914 | Piner |
| 1,240,376 | A | 9/1917 | Saucier |
| 1,340,477 | A | 5/1920 | Dallard |
| 1,401,144 | A | 12/1921 | Dicks |
| 1,475,907 | A | 11/1923 | Volman |
| 1,575,488 | A | 3/1926 | Jakobey |
| 1,644,807 | A | 10/1927 | Zeigler |
| 1,749,491 | A | 3/1930 | Kokay |
| 1,846,422 | A | 2/1932 | Hands |
| 2,102,602 | A | 12/1937 | Nash |

(Continued)

FOREIGN PATENT DOCUMENTS

| DE | 48512 | 2/1889 |
| DE | 3609357 | 10/1987 |

(Continued)

*Primary Examiner* — Muhammad Ijaz
(74) *Attorney, Agent, or Firm* — Bracewell LLP; Douglas W. Rommelmann (57) ABSTRACT

A tree stand having a base assembly including a bottom, a sidewall, a plurality of stanchions, and a plurality of receivers. The bottom, sidewall and plurality of stanchions define a water reservoir. Each stanchion includes an upper portion having a bore arranged and designed to engage a bolt for securing a tree. The tree stand includes a plurality of legs having a connecting end and a distal end. The connecting end of each leg is arranged and designed to be releasably attached to one of the plurality of receivers.

19 Claims, 6 Drawing Sheets

(56) References Cited

U.S. PATENT DOCUMENTS

| | | |
|---|---|---|
| 2,113,688 A | 4/1938 | Grant |
| 2,156,195 A | 4/1939 | Robillard |
| D125,771 S | 3/1941 | Kiesow |
| 2,461,687 A | 2/1949 | Hopfeld |
| 2,463,263 A | 3/1949 | Gordon |
| 2,546,336 A | 3/1951 | Gibbons |
| 2,605,067 A | 7/1952 | Lindsell |
| 2,636,528 A | 4/1953 | Golnick |
| 2,644,498 A | 7/1953 | Malecki |
| 2,671,482 A | 3/1954 | Gordon |
| 2,681,780 A | 6/1954 | Santoro |
| 2,705,983 A | 4/1955 | Guadagna |
| 2,905,414 A | 9/1959 | Zierden |
| 2,933,274 A | 4/1960 | Mausolf |
| 2,947,333 A | 8/1960 | Johnson |
| 3,026,075 A | 3/1962 | Phelon et al. |
| 3,051,423 A | 8/1962 | Wagner et al. |
| 3,066,931 A | 12/1962 | Beals |
| 2,408,801 A | 10/1964 | Miller |
| 3,193,277 A | 7/1965 | Nagamori |
| 3,384,141 A | 5/1968 | Kost |
| 3,599,960 A | 8/1971 | Phillips |
| 4,007,901 A | 2/1977 | Mancini et al. |
| 4,048,754 A | 9/1977 | Laux |
| 4,254,578 A | 3/1981 | Hanfield |
| 4,496,129 A | 1/1985 | Waterman et al. |
| 4,534,547 A | 8/1985 | Cox |
| 4,541,601 A | 9/1985 | Corbisello |
| 4,569,510 A | 2/1986 | Haramoto |
| 4,571,881 A | 2/1986 | Lathim |
| 4,582,307 A | 4/1986 | Wang |
| 4,642,011 A | 2/1987 | Uramoto et al. |
| D297,520 S | 9/1988 | Thomas |
| 4,834,335 A | 5/1989 | Attar |
| 4,884,363 A | 12/1989 | Sofy |
| 4,913,395 A | 4/1990 | Juhas |
| 4,989,820 A | 2/1991 | Sterling |
| 5,121,897 A | 6/1992 | Sofy |
| 5,318,267 A * | 6/1994 | Rast ................. A47G 33/12 248/542 |
| 5,320,323 A | 6/1994 | Clark, Jr. |
| D351,570 S | 10/1994 | Fillipp |
| 5,484,131 A | 1/1996 | Aldrete et al. |
| 5,551,659 A | 9/1996 | Sofy |
| 5,551,818 A | 9/1996 | Koppel |
| 5,568,916 A | 10/1996 | Gibbons et al. |
| 5,580,026 A | 12/1996 | Newcomer |
| 5,690,454 A | 11/1997 | Smith |
| 5,707,037 A | 1/1998 | Pastrick |
| 5,725,193 A * | 3/1998 | Adams ................. A47G 33/12 248/524 |
| 5,743,508 A * | 4/1998 | Fiveash ................. A47G 33/12 248/527 |
| 5,850,680 A | 12/1998 | Verrier et al. |
| 5,913,509 A | 6/1999 | Price et al. |
| 5,938,168 A * | 8/1999 | Adams ................. A47G 33/12 248/524 |
| 5,941,152 A | 8/1999 | Kim |
| 6,098,973 A | 8/2000 | Khachatoorian |
| 6,129,325 A | 10/2000 | Niklas |
| 6,250,621 B1 | 6/2001 | Ping |
| 6,286,804 B1 | 9/2001 | Avinger et al. |
| 6,419,202 B1 | 7/2002 | Thurner |
| 6,681,519 B2 | 1/2004 | Cone |
| 6,739,813 B1 | 5/2004 | Gundy et al. |
| 6,877,274 B2 | 4/2005 | Fiveash |
| 6,993,868 B2 | 2/2006 | Hronyetz |
| 7,044,427 B2 | 5/2006 | Eckenswiller |
| 7,073,755 B2 | 7/2006 | Michaud et al. |
| 7,600,342 B2 | 10/2009 | Fiveash |
| 2004/0045216 A1* | 3/2004 | Fiveash ................. A47G 33/12 47/40.5 |
| 2005/0051695 A1* | 3/2005 | Kovach ................. A47G 33/12 248/524 |
| 2006/0186305 A1 | 8/2006 | Krinner |
| 2006/0226332 A1 | 10/2006 | Kowalski |
| 2006/0255231 A1 | 11/2006 | Rainford et al. |
| 2007/0023606 A1 | 2/2007 | Zimmermann |
| 2014/0151526 A1* | 6/2014 | Duncan ................. A47G 33/12 248/523 |
| 2015/0335189 A1* | 11/2015 | Nally ................. F16M 11/16 248/516 |
| 2016/0037951 A1* | 2/2016 | Meves ................. A47G 33/12 47/40.5 |

FOREIGN PATENT DOCUMENTS

| | | |
|---|---|---|
| DE | 4113924 | 11/1992 |
| FR | 2629176 | 9/1989 |
| GB | 2200966 | 8/1988 |

* cited by examiner

CHRISTMAS TREE STAND

CROSS-REFERENCE TO RELATED APPLICATIONS

This application claims the benefit of U.S. Provisional Application Ser. No. 62/920,595, filed on May 6, 2019, entitled "Christmas Tree Stand." Applicant incorporates by reference herein application Ser. No. 62/920,595 in its entirety.

BACKGROUND OF THE INVENTION

1. Field of the Invention

The present invention relates generally to tree stands, and more particularly to tree stands for Christmas trees.

2. Description of the Related Art

Related prior art includes inventor's patents: U.S. Pat. No. 5,743,508 issued Apr. 28, 1998 for "Tree Stand With Upward/Extending Support Members Forming Part of a Water Basin"; U.S. Pat. No. 6,877,274, issued Apr. 12, 2005 for "Tree Stand"; and U.S. Pat. No. 7,600,342, issued Oct. 13, 2009 for "Tree Stand With Fast-Acting Screw Assembly and Method of Using Same."

Recently, it has become popular for people to mail order their Christmas tree and have it delivered to their doorstep. In order to keep the shipping costs down, each tree is packaged in as small a box as reasonably possible. A typical size box is 12" by 12" by 84" for an approximately 7' tall tree.

It is desirable to include a tree stand with the Christmas tree. It is further desirable that the tree stand also fits in the box with the Christmas tree. It is desirable to have a tree stand that is compact and can be included with the Christmas tree in the box while also ensuring that the tree stand is easy to use and provides ample strength and support to maintain the Christmas tree in the upright position when decorated for the holidays.

SUMMARY OF THE INVENTION

The present invention relates to tree stands which are compact for shipping and easily assembled. The tree stand comprises a base assembly and legs which are removably attachable to the base assembly. The base assembly preferably includes a bottom, a sidewall, a plurality of upright stanchions joined to the bottom and to the sidewall. The bottom, sidewall and upright stanchions define a water reservoir. Each stanchion includes a bore for receiving a bolt used to secure a tree in an upright position.

The tree stand is particularly suited for use with mail order live Christmas trees and small enough to be packaged with the Christmas tree is a typical box used for shipping the Christmas tree.

BRIEF DESCRIPTION OF THE SEVERAL VIEWS OF DRAWINGS

The invention is better understood by reading the detailed description of embodiments which follows and by examining the accompanying drawings, in which.

DESCRIPTION OF THE PREFERRED EMBODIMENTS

It should be understood at the outset that although illustrative implementations of one or more embodiments are described below, the disclosed assemblies, systems and methods may be implemented using any number of techniques, whether currently known or not yet in existence. The disclosure should in no way be limited to the illustrative implementations, drawings, and techniques described below, but may be modified within the scope of the appended claims along with their full scope of equivalents.

The following brief definition of terms shall apply throughout the application:

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the field of the art;

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiment, or it may be excluded.

Embodiments of the invention will now be described with reference to the figures, in which like numerals reflect like elements throughout. The terminology used in the description presented herein is not intended to be interpreted in any restrictive or limited way, simply because it is being utilized in conjunction with the detailed description of certain specific embodiments of the invention. Furthermore, embodiments of the invention may include several novel features, no single one of which is solely responsible for its desirable attributes or which is essential to practicing the invention described herein.

Figure 1:
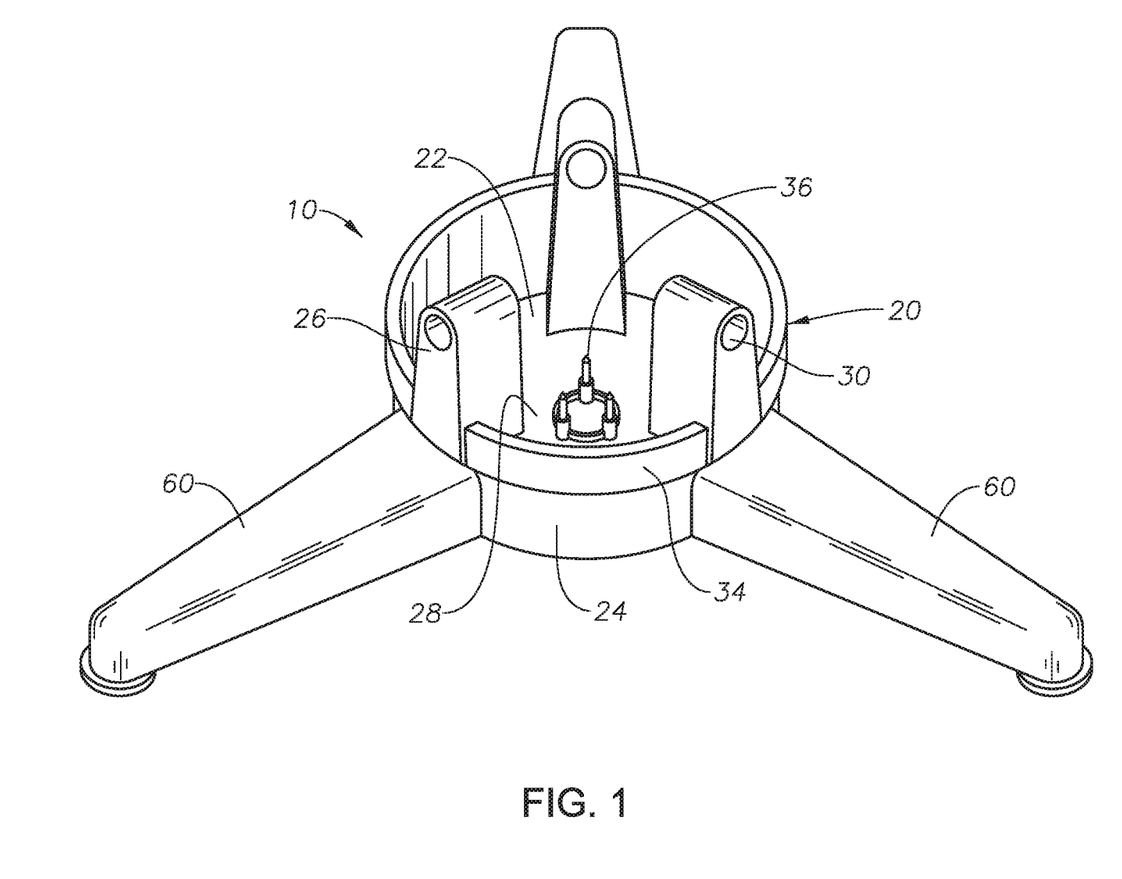
FIG. 1 is top perspective view of the tree stand according to an embodiment of the present invention showing the base assembly and legs.
Figure 2:
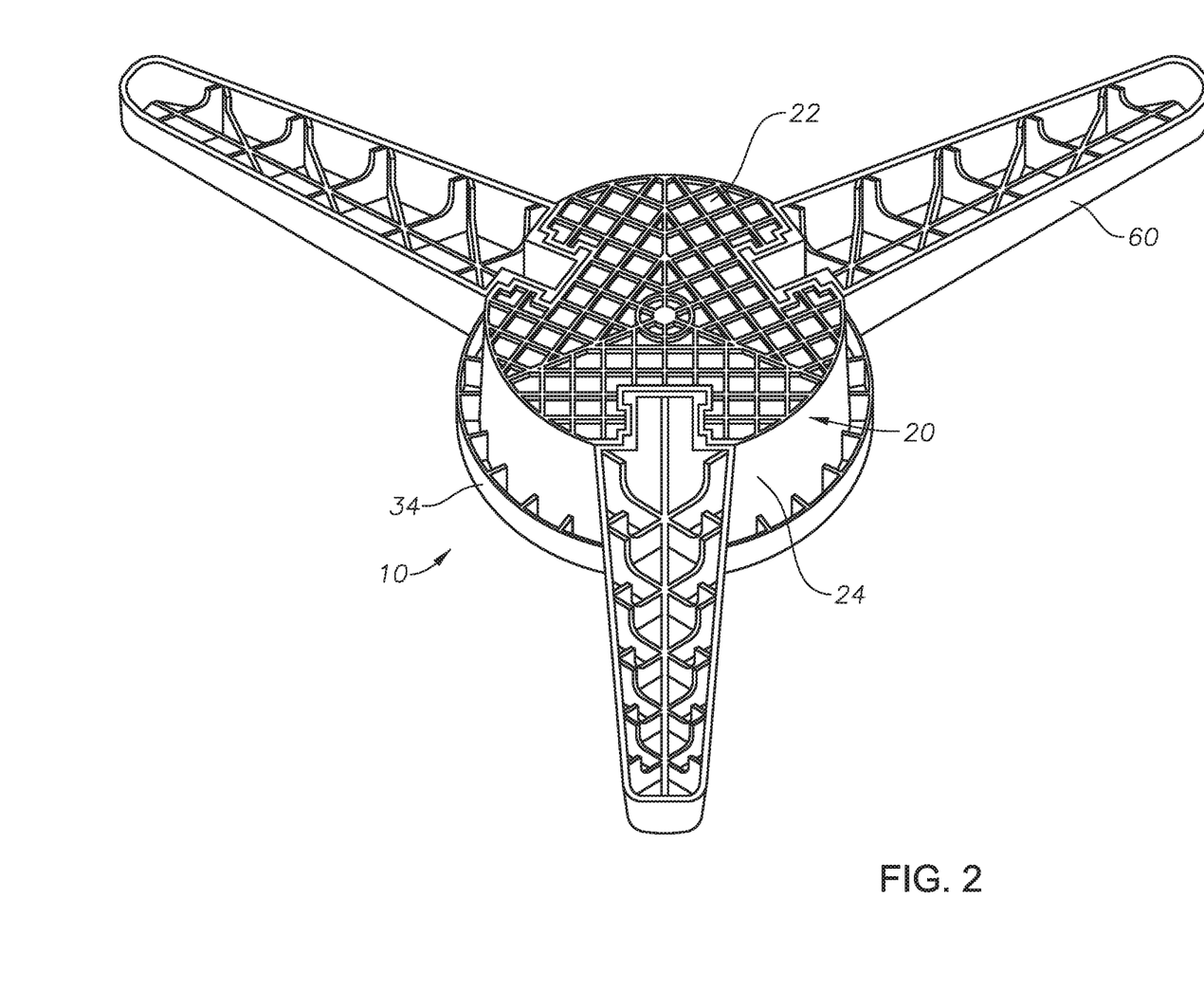
FIG. 2 is bottom perspective view of the tree stand shown in FIG. 1.
Figure 3:
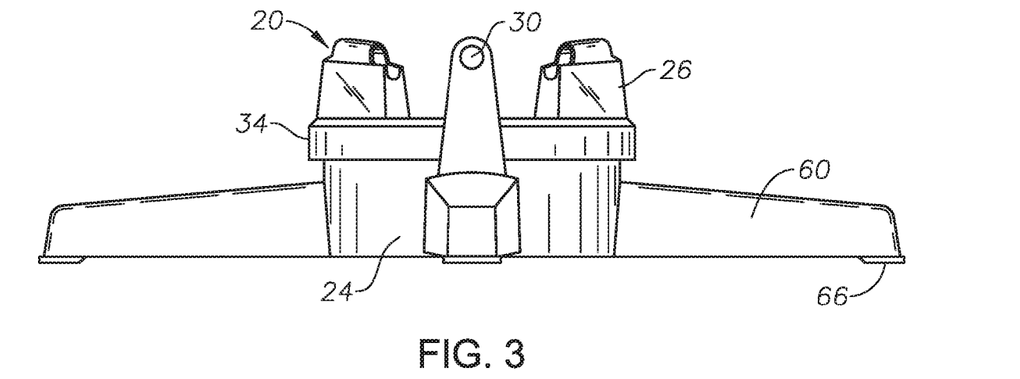
FIG. 3 is an elevation view of the tree stand of FIG. 1.

FIGS. 1 and 2 are top and bottom perspective views, respectively, of a tree stand 10 according to a preferred embodiment of the present invention. FIG. 3 is an elevation view of the tree stand 10 of FIGS. 1 and 2.

The present invention relates to tree stands 10 which are compact for shipping and easily assembled. A preferred embodiment of the tree stand 10 comprises a base assembly 20 and a plurality of legs 60 which are removably attachable to the base assembly 20. Preferably, the base assembly 20 includes a bottom 22 joined to a sidewall 24, and a plurality of upright stanchions 26 joined to the bottom 22 and to the sidewall 24 as shown in FIG. 1. The bottom 22, sidewall 24 and upright stanchions 26 define a water reservoir 28.

Preferably, the plurality of upright stanchions 26 are connected, joined or integrally formed with the sidewall 24 and the bottom 22. Preferably, three or four upright stanchions 26 are desirable to secure a tree trunk to the tree stand 10. The stanchions 26 preferably have a height greater than the height of the sidewall 24.

Each upright stanchion 26 includes a bore 30 for receiving a bolt 32 (FIG. 4) used to secure a tree in an upright position. In a preferred embodiment, the bore 30 is a threaded Tore and threadedly engages the bolt 32 in an upper portion of the upright stanchion 26.

As shown in FIGS. 1-3, the embodiment of the tree stand 10 has three stanchions 26 and three legs 60 equally spaced around the circumference of the base assembly 20. It is to be understood that the invention is not limited to three stanchions 26 and three legs 60. Preferably, the number of stanchions 26 and number of legs 60 is the same. Preferably, each stanchion 26 is radially aligned with and adjacent to a joined leg 60 as shown in FIG. 1.

Figure 5:
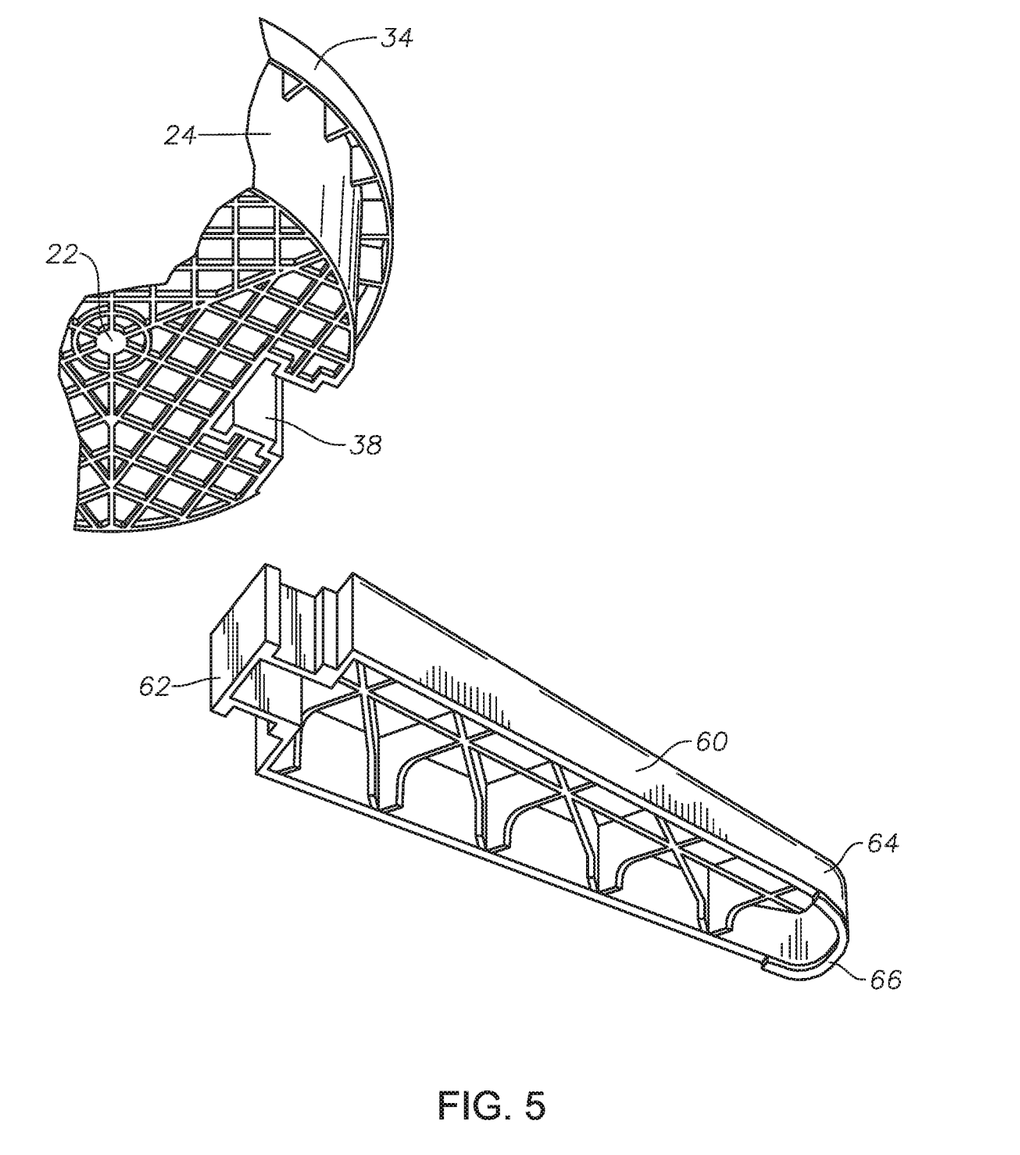
FIG. 5 is a bottom perspective view showing a portion of the tree stand base assembly and a leg aligned for connection to the base assembly.

Referring to FIGS. 2 and 5, the upper portion of the sidewall 4 preferably forms a double-wall upper lip 34 reinforced with gussets to provide added strength and rigidity to the base assembly 20. The upright stanchions 26 are also preferably connected to the double-wall upper lip 34.

Referring to FIG. 1, a restraining device 36, preferably comprising one or more upright nails with pointed end extending upward, is located near the center of the bottom 22 in the water reservoir 28. The pointed end of the nails 36 extend upwardly a short length and are provided to engage the bottom of a tree trunk. The restraining device 36 helps to lock and centralize the tree before final adjustment and prevents the bottom of the tree trunk from lateral movement when the tree is mounted in the tree stand 10. Preferably, the nails 36 are in the mold during the molding process of the base assembly 20.

Figure 4:
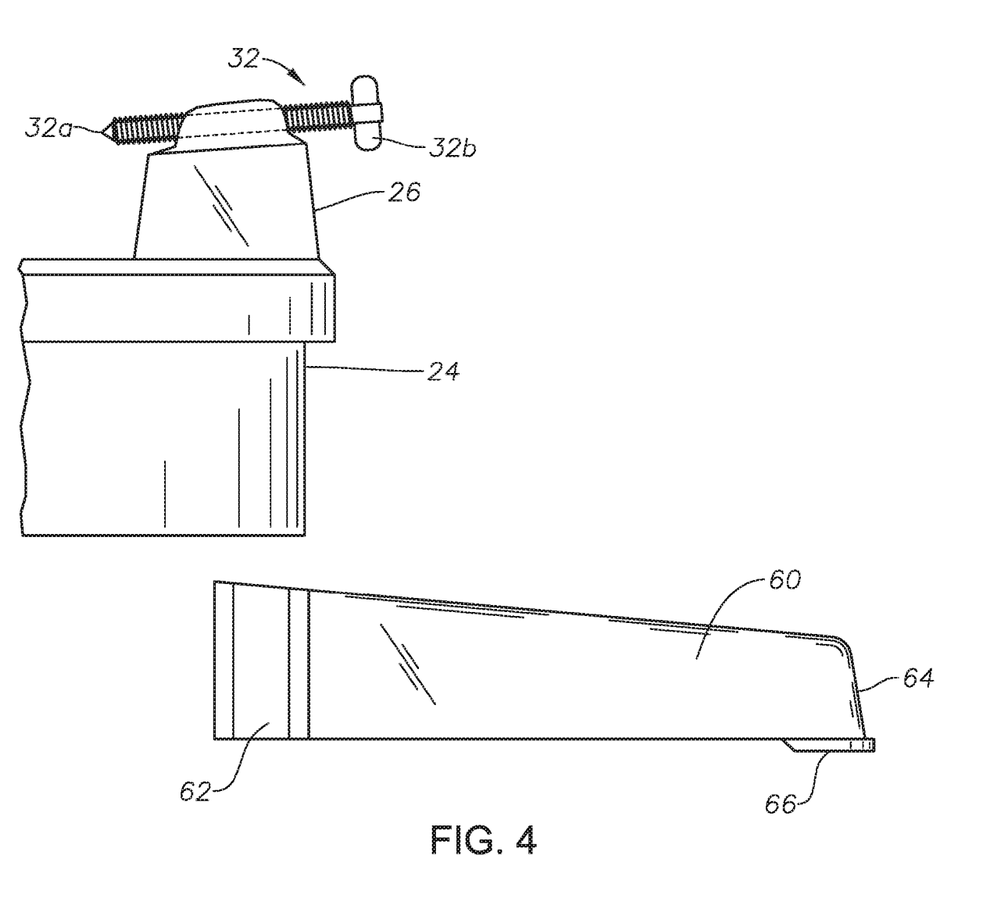
FIG. 4 is an elevation view showing a portion of the tree stand base assembly and a leg aligned for connection to the base assembly.
Figure 6:
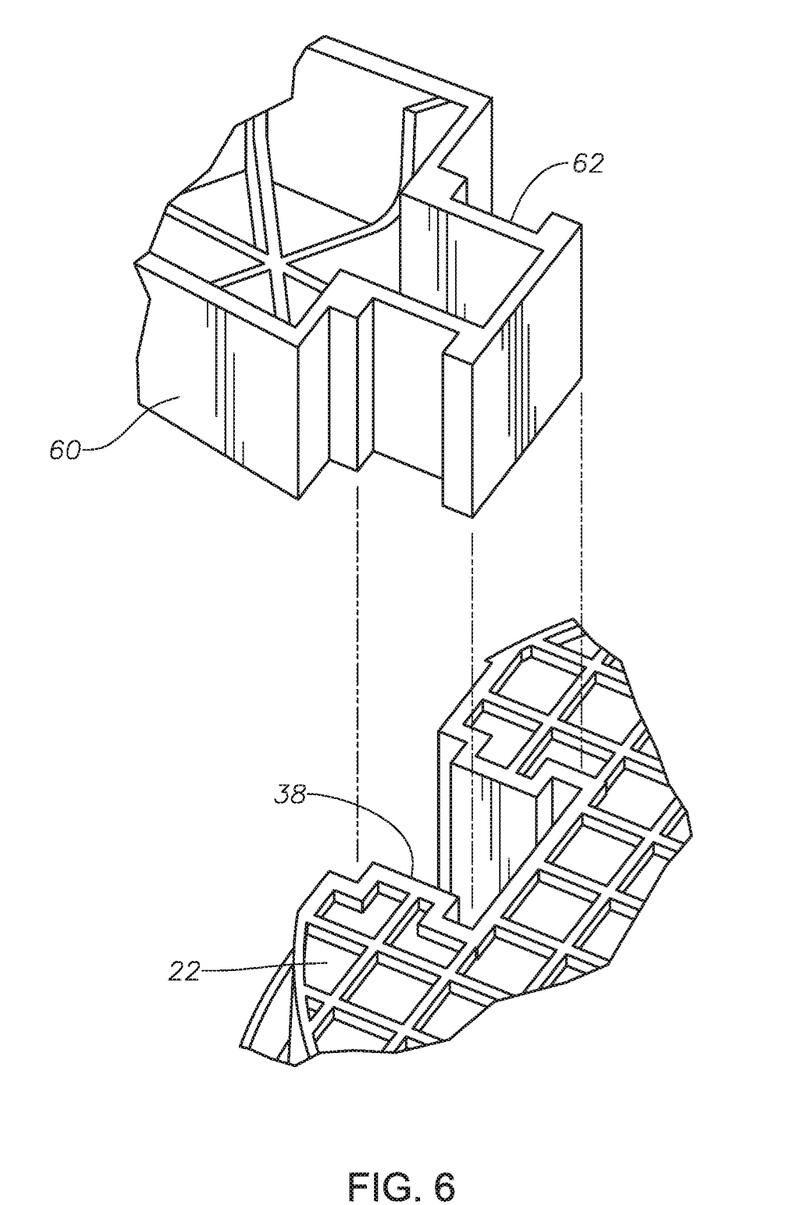
FIG. 6 is a perspective view showing how the leg connects to the base assembly.
Figure 7:
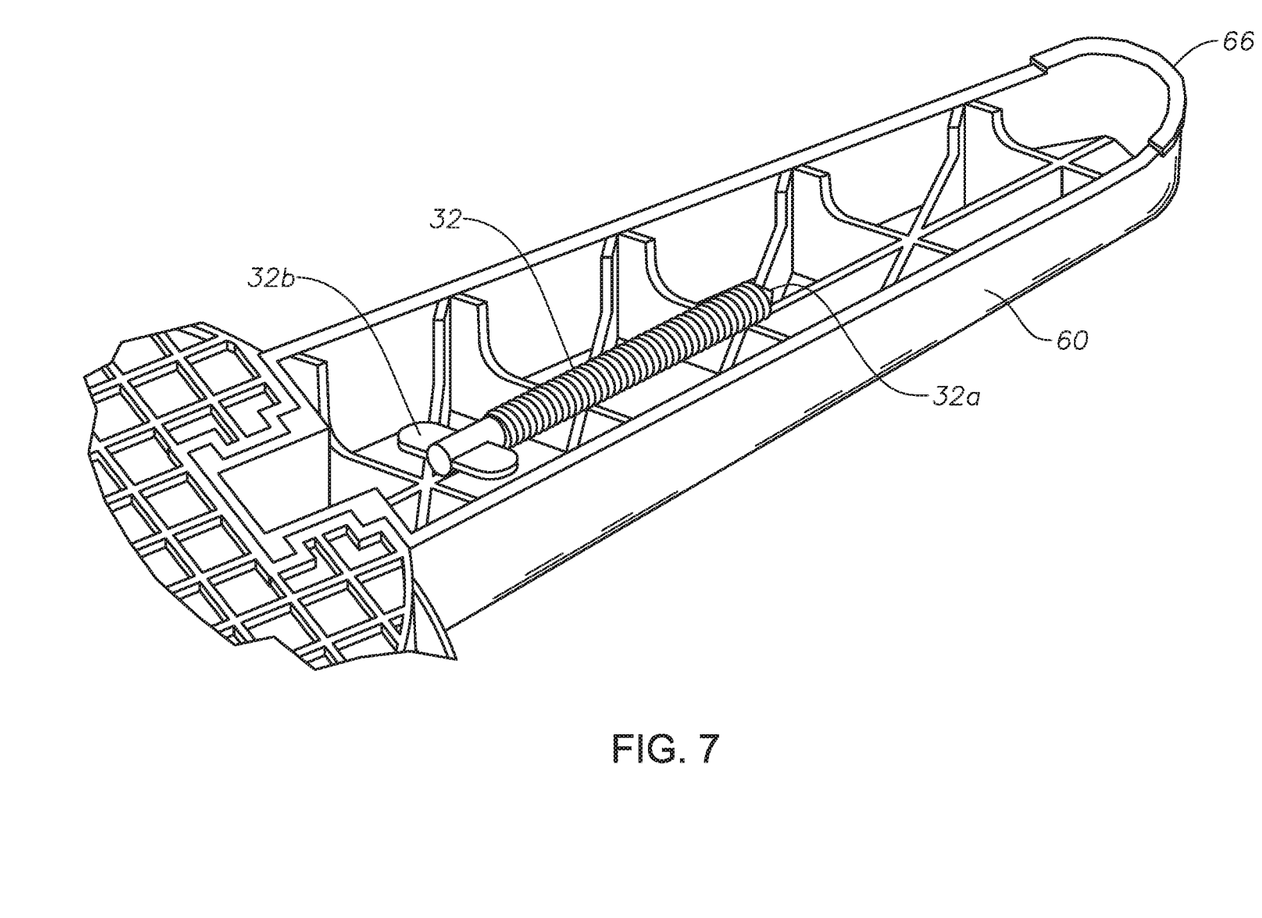
FIG. 7 is a perspective view showing a portion of the tree stand base assembly having a leg connected to the base assembly and a bolt removably attached to the interior of the leg.

As shown in FIGS. 4 and 5, the legs 60 are elongate and include a connecting end 62 and a distal end 64. The base assembly 20 includes a plurality of receivers 38 for attaching the connecting end 62 of the legs 60 to the base assembly 20 as shown in FIGS. 5 and 6. The receivers 38 are preferably formed within a lower portion of the upright stanchions 26 and provide further strength and rigidity to the stanchions 26 and base assembly 20. Preferably, the leg connecting end 62 and the receiver 38 securely connect to one another. In the illustrated preferred embodiment, the secure connection is accomplished with a sliding friction fit somewhat similar to a dovetail-type connection. It is to be understood that other types of connections may be used to securely connect the legs 60 to the base assembly 20.

Referring to FIGS. 5 and 6, the receiver 38 has an opening in the bottom and lower end of the sidewall 24 arranged and designed to receive the connecting end 62 of the leg 60. The leg 60 preferably attaches to the base assembly 20 at the lower end of the base assembly 20. As shown in FIGS. 1 and 3, the attached leg 60 has a low vertical profile and is below the height of the sidewall 24, and preferably is below the height of the double-wall upper lip 34.

Referring to FIGS. 5 and 6, the leg connecting end 62 is preferably an elongated dovetail extension extending from the leg 60 arranged and designed to be slidably received within a corresponding receptacle of the receiver 38, Preferably, the leg connecting end 62 slides into the receiver 38 from the below the bottom 22 of the base assembly 20. The connecting end 62 and receiver 38 may include a catch or friction fit upon engagement to further secure the leg 62 to the base assembly 20. The engagement of the connecting end 62 with the receiver 38 maintains the leg connecting end 62 within the base assembly 20 and prevents the legs 60 from releasing radially outward of the base assembly 20.

Preferably, the distal end 64 of each leg 60 includes a lower foot 66. With the legs 60 attached to the base assembly 20, the tree stand 10 may be supported on a floor by the feet 66 when there is no downward load (e.g., a tree) on the tree stand 10. In other words, the only portion of the tree stand 10 contacting the floor may be the feet 66. However, with a tree mounted in the tree stand 10, the bottom 22 of the base assembly 20 will contact the floor and the feet 66 will also be in contact with the floor. The feet 66 are provided to ensure that all three legs 60 remain in contact with the floor even if the floor is not perfectly flat. This eliminates any wobbling of the tree stand 10 and provides support against the tree toppling over while in the stand 10.

As stated above, each of the stanchions 26 has an internal threaded opening 30 for receiving a bolt 32 which is arranged and designed to be rotated to bring a contact point 32a of the bolt 32 into contact with the trunk of the tree, Preferably, the upper portion of each stanchion 26 is located above the upper surface of the water reservoir 28 to facilitate the engagement of the bolts 32 with the tree trunk. By molding the stanchions 26 inwardly from the sidewall 24 of the stand 10, the support point for each of the bolts 32 on each of the stanchions 26 is close to the tree which shortens the length of each bolt 32 from each stanchion 26 to the tree to thereby minimize a desirable forces on the bolts 32 or the stanchions 26 when the bolts 32 are tightened into contact with the tree. Therefore, even though the stand 10 is made of a plastic resin, the bolt tightening forces do not crack or break the bolts 32 or the stand 10.

Preferably, each of the bolts 32 is formed with acme threads or other fast threads that can be rotated to travel rapidly in inward and outward axial directions for alternately securing and releasing the contact of the bolt end point 32a with the tree trunk. Each bolt 32 has a handle 32b to facilitate its rotation. Each bolt 32 is formed of a plastic resin such as polypropylene in the preferred form of the invention.

Preferably, the bolts 26 are molded separately from the legs 60. However, preferably the legs 60 include an open bottom portion having a releasable engagement mechanism, for example a clip or prong, to connect a bolt 26 to the leg 60 for purposes of shipping. The bolts 26 are removable from the engagement mechanism, preferably without a tool. The bolts 26 may be frictionally connected to the legs 60.

Preferably, the tree stand 10, including the base assembly 20 and the plurality of legs 60, are molded of a plastic resin such as polypropylene, and the bolts 26 are preferably molded separately from the rest of the stand 10. The bolts 26 are then packaged with the rest of the tree stand 10 for shipping. For smaller trees that are usually displayed on a table top, the bolts 26 may be made entirely of a plastic resin such as polypropylene, but for larger sizes of stands 10, a steel reinforcing member may form the core of each molded bolt.

An example of a tree stand 10 according to a preferred embodiment of the present invention includes a base assembly 20 having an outer diameter of approximately 11.5" and each leg 60 having an overall length in the range of 12" to 14.5".

Nomenclature
tree stand 10
base assembly 20
bottom 22
sidewall 24
upright stanchion 26
water reservoir 28
bore 30
bolt 32
contact point 32a
handle 32b
upper lip 34
restraining device 36
receiver 38
leg 60
connecting end 62
distal end 64
foot 66

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

I claim:

1. A tree stand (10) comprising:
a base assembly (20) having a bottom (22), a sidewall (24), a plurality of upright stanchions (26) integrally formed with the sidewall, and a plurality of receivers (38), the plurality of upright stanchions (26) having a height greater than a height of the sidewall (24)
wherein the bottom (22), sidewall (24) and plurality of upright stanchions (26) define a water reservoir (28);
a plurality of bolts (32), each bolt (32) arranged and designed to engage a bore (30) in an upper portion of each upright stanchion (26); and
a plurality of legs (60), each leg (60) having a connecting end (62) and a distal end (64),
wherein the connecting end (62) of each leg (60) is arranged and designed to be releasably attached to one of the plurality of receivers (38).

2. The tree stand (10) of claim 1, wherein a number of the plurality of upright stanchions (26) is the same as the number of the plurality of receivers (38).

3. The tree stand (10) of claim 2, wherein the plurality of receivers (38) are formed within the plurality of upright stanchions (26).

4. The tree stand (10) of claim 1, wherein at least one of the plurality of upright stanchions (26) is radially aligned with at least one of the plurality of legs (60) attached to the base assembly (20).

5. The tree stand (10) of claim 1, wherein each of the plurality of legs (60) attaches to the base assembly (20) at a lower end of the base assembly (20).

6. The tree stand (10) of claim 5, wherein each of the plurality of receivers (38) includes an opening in the bottom (22) and a lower end of the sidewall (24) arranged and designed to receive the connecting end (62) of one of the plurality of legs (60).

7. The tree stand (10) of claim 1, wherein the plurality of legs (60) have a low vertical profile which is less than the height of the sidewall (24).

8. The tree stand (10) of claim 1, wherein an upper portion of the sidewall (24) forms a double-wall upper lip (34) and the plurality of legs (60) have a vertical profile that is below the double-wall upper lip (34).

9. The tree stand (10) of claim 1, wherein the bottom (22), the sidewall (24), the plurality of upright stanchions (26), the plurality of legs (60) and the plurality of bolts (32) are formed of a plastic resin.

10. The tree stand (10) of claim 9, wherein the plastic resin is polypropylene.

11. A tree stand (10) comprising:
a base assembly (20) having a bottom (22), a sidewall (24), a plurality of upright stanchions (26) joined to the sidewall and bottom, and a plurality of receivers (38), wherein the bottom (22), sidewall (24) and plurality of upright stanchions (26) define a water reservoir (28);
a plurality of bolts (32), each bolt (32) arranged and designed to engage a bore (30) in an upper portion of each upright stanchion (26),
wherein each bore (30) in each upright stanchion (26) is located above an upper surface of the water reservoir (28); and
a plurality of releasably attachable legs (60), each leg (60) having a connecting end (62) and a distal end (64),
wherein each of the plurality of receivers (38) includes an opening in the bottom (22) and a lower end of the sidewall (24) arranged and designed to vertically receive the connecting end (62) of one of the plurality of legs (60).

12. The tree stand (10) of claim 11, wherein a number of the plurality of upright stanchions (26) is the same as the number of the plurality of receivers (38).

13. The tree stand (10) of claim 11, wherein the plurality of receivers (38) are formed within the plurality of upright stanchions (26).

14. The tree stand (10) of claim 11, wherein at least one of the plurality of upright stanchions (26) is radially aligned with at least one of the plurality of legs (60) attached to the base assembly (20).

15. The tree stand (10) of claim 11, wherein the plurality of upright stanchions (26) have a height greater than a height of the sidewall (24).

16. The tree stand (10) of claim 15, wherein the plurality of legs (60) have a low vertical profile which is less than the height of the sidewall (24).

17. The tree stand (10) of claim 11, wherein an upper portion of the sidewall (24) forms a double-wall upper lip (34) and the plurality of legs (60) have a vertical profile that is below the double-wall upper lip (34).

18. The tree stand (10) of claim 11, wherein the bottom (22), the sidewall (24), the plurality of upright stanchions (26), the plurality of legs (60) and the plurality of bolts (32) are formed of a plastic resin.

19. The tree stand (10) of claim 18, wherein the plastic resin is polypropylene.

* * * * *